(12) United States Patent
Dekker et al.

(10) Patent No.: US 11,035,879 B2
(45) Date of Patent: Jun. 15, 2021

(54) Z-POSITION MOTION STAGE FOR USE IN A SCANNING PROBE MICROSCOPY SYSTEM, SCAN HEAD AND METHOD OF MANUFACTURING

(71) Applicant: Nederlandse Organisatie voor toegepast-natuurwetenschappelijk onderzoek TNO, s-Gravenhage (NL)

(72) Inventors: Albert Dekker, Delft (NL); Martinus Cornelius Johannes Maria van Riel, s-Gravenzande (NL); Aukje Arianne Annette Kastelijin, Schiedam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/652,860

(22) PCT Filed: Oct. 2, 2018

(86) PCT No.: PCT/NL2018/050653
§ 371 (c)(1),
(2) Date: Apr. 1, 2020

(87) PCT Pub. No.: WO2019/070120
PCT Pub. Date: Apr. 11, 2019

(65) Prior Publication Data
US 2020/0233013 A1 Jul. 23, 2020

(30) Foreign Application Priority Data
Oct. 2, 2017 (EP) .................................. 17194366

(51) Int. Cl.
*G01Q 70/02* (2010.01)
*G01Q 10/04* (2010.01)

(52) U.S. Cl.
CPC ............. *G01Q 70/02* (2013.01); *G01Q 10/04* (2013.01)

(58) Field of Classification Search
CPC ........ G01Q 10/00; G01Q 10/02; G01Q 10/04; G01Q 10/045; G01Q 20/00; G01Q 70/00; G01Q 70/02
(Continued)

(56) References Cited

U.S. PATENT DOCUMENTS 10,288,643 B2 * 5/2019 Kuiper .................. G01Q 20/00
2014/0380532 A1 12/2014 Park et al.

FOREIGN PATENT DOCUMENTS

JP  2000241333 A   9/2000
JP  2003315239 A  11/2003
(Continued)

OTHER PUBLICATIONS

"Turning." Wikipedia, Wikipedia Foundation, retrieved on Mar. 13, 2012, http://en.wikipedia.org/wiki/Turning.
(Continued)

*Primary Examiner* — Nicole M Ippolito
(74) *Attorney, Agent, or Firm* — Leydig, Voit, & Mayer, Ltd.

(57) ABSTRACT

The present document relates to a Z-position motion stage for use in a scanning probe microscopy system. The stage comprises a support element for mounting the z-position motion stage on a scan head, and at least one first actuator mounted on the support element for enabling motion of a probe of the scanning probe microscopy system. The probe is connected to or attachable to the z-position motion stage. The support element and the at least one first actuator are shaped and mounted such as to form a rotation symmetric element which is rotation symmetric around a notional common longitudinal axis. The document further relates to (Continued)

a scan head, a method of manufacturing a z-position motion stage, and a Z-position motion stage obtained with such a method.

13 Claims, 6 Drawing Sheets

(58) Field of Classification Search
USPC .............. 250/440.11, 441.11, 442.11, 443.1; 850/1, 2, 3, 4, 5, 6, 7
See application file for complete search history.

(56) References Cited

FOREIGN PATENT DOCUMENTS

| | | |
|---|---|---|
| JP | 2004301728 A | 10/2004 |
| WO | WO 2007101133 A1 | 9/2007 |
| WO | WO 2017090582 A1 | 9/2018 |

OTHER PUBLICATIONS

Bruker Corporation, "Dimension FastScan, The World's Fastest AFM," productinfo@bruker-nano.com, B077, Rev. A2, © 2011 www.bruker.com (8 pages).

* cited by examiner

Z-POSITION MOTION STAGE FOR USE IN A SCANNING PROBE MICROSCOPY SYSTEM, SCAN HEAD AND METHOD OF MANUFACTURING

CROSS-REFERENCE TO RELATED APPLICATIONS

This patent application is a U.S. National Phase of PCT International Application No. PCT/2018/050653, filed Oct. 2, 2018, which claims priority to European Application No. 17194366.5, filed Oct. 2, 2017, which are both expressly incorporated by reference in their entireties, including any references contained therein.

FIELD OF THE INVENTION

The present invention is directed at a Z-position motion stage for use in a scanning probe microscopy system, the z-position motion stage comprising a support element for mounting the z-position motion stage on a scan head of the scanning probe microscopy system, and at least one first actuator mounted on the support element for enabling motion of a probe of the scanning probe microscopy system, the probe is connected to or attachable to the z-position motion stage. The invention is further directed at a scan head for use in a scanning probe microscopy system, such as an atomic force microscopy system.

The invention is further directed at a method of manufacturing a z-position motion stage for use in a scanning probe microscopy system, wherein the z-position motion stage comprises a probe or wherein the z-position motion stage is arranged for having attached thereto the probe, the method comprising the steps of: producing a support element, the support element being arranged for mounting the z-position motion stage on a scan head of the scanning probe microscopy system; and mounting of at least one first actuator on the support element for enabling motion of the probe of the scanning probe microscopy system.

BACKGROUND

Conventional Scanning Probe Microscopy systems are relatively large, consisting of table-top systems. In these systems, typically only one probe is active. Although such systems are able to visualize even the smallest details of a scanned surface to be studied, these systems are typically not very fast. The application of a single probe limits the system to studying only one surface region at a time. Lately, faster systems have been developed that allow scanning a plurality of surface areas at a time using multiple probes. Although this increases the performance considerably, a disadvantage of such systems is that the use of multiple probes likewise increases the bulkiness of the system.

SUMMARY OF THE INVENTION

It is an object of the present invention to enable miniaturization of scanning probe microscopy systems. It is a further object to provide a Z-position motion stage, useable in or for a scan head of a scanning probe microscopy system, which provides excellent stability and dynamic performance and which allows miniaturization.

To this end, there is provided herewith a Z-position motion stage for use in a scanning probe microscopy system, the z-position motion stage comprising a support element for mounting the z-position motion stage on a scan head of the scanning probe microscopy system, and at least one first actuator mounted on the support element for enabling motion of a probe of the scanning probe microscopy system, the probe is connected to or attachable to the z-position motion stage, wherein the support element and the at least one first actuator are shaped and mounted such as to form a rotation symmetric element which is rotation symmetric around a notional common longitudinal axis.

In accordance with the present invention, the Z-position motion stage (i.e. the stage supporting the probe and enabling precise motion thereof in the Z-direction) includes a support element that is rotation symmetric around a notional common longitudinal axis. Also the first actuator, the actuator that enables precise motion in the Z-direction such as for example (but not limited to) following height differences provided by features on the substrate surface during scanning, is rotation symmetric around the notional common longitudinal axis.

The rotation symmetric shape has a higher intrinsic stiffness, and therefore the design of the Z-position motion stage may be simpler. For example, conventionally additional elements and parts are required in order to provide the desired stiffness of the design. Due to the fact the rotation symmetric support element of itself provides for high stiffness, additional support parts to accomplish this may be dispensed with. As a result less supporting elements are required that conventionally cause a scan head to become bulky, and therefore a compact design becomes achievable.

The more compact design of the Z-position motion stage in turn enables a scan head, wherein the stage may be applied, which may provide for a more compact design. This allows the use of more scan heads to be operated on different locations of a sample surface, which increases throughput considerable. A scanning probe microscopy system having such high performance characteristics in terms of throughput may advantageously be applied in an industrial environment, e.g. for monitoring semiconductor production processes by scanning wafers in a production line.

A further advantage of the design of the invention, is that the rotation symmetric support part may be much smaller in dimension, and thereby provides for higher resonance frequencies. Likewise, the achievement of high resonance frequencies further increases performance. As may be understood, in tapping mode for example, a higher resonance frequency allows faster scanning as it provides for a larger number of taps per second. To provide an example, an outer diameter of the support element may be between 1.0 and 13.0 millimeter, preferably between 3.0 and 10.0 millimeter, for example 8 millimeter or 9 millimeter. The first actuator may have a smaller diameter, for example between 2 and 8 millimeter, such as 5 millimeter. The first actuator may be operated at a suitable frequency, for example 50 kilohertz, although with small dimensions the resonance frequency could be up to a few hundred kilohertz.

Also, the elegant and simple design allows better production methods such as turning (rather than spark-erosion which is typically used), that result in higher production accuracy and higher production predictability.

In accordance with embodiments of the invention, the support element has a circular shape in cross section transverse to the notional common longitudinal axis. Although rotation symmetric support elements may be of different shape than circular, in terms of stability, stiffness and compactness, a circular shape performs most optimal. Hence the circular shape provide for a preferred class of embodiments. The skilled person may appreciate that sufficient stability may already be achieved with different rotation symmetric shapes, for example polygons.

In accordance with some embodiments, the support element comprises at least one projecting portion, the at least one projecting portion being circumferentially arranged around the notional common longitudinal axis and rotation symmetric therewith, wherein the at least one projecting portion comprises an apex portion forming a stationary ring for supporting the z-position motion stage on the scan head. The projecting portion may for example direct in the same direction as the notional axis. The apex of the projecting portion provides for a stationary ring. The stationary ring itself, when used as the interface between the support element and the scan head, provides for improved dynamic performance. The stationary ring has a diameter and form factor which is such that the harmonic modes of the stage have a common origin. This thereby forms a stable support. The apex of the projecting portion forms the contact area between the support element and the scan head. The apex thereby minimizes contact between the scan head and the Z-position motion stage. This causes effective decoupling of the Z-position motion stage and the scan head frame, which prevents any vibrations in the z-motion stage to be conveyed to the scan head frame. The interfacing of the stage to the scan head may thus be made with minimal dynamic coupling, which is advantageous, as it prevents coupling disturbing vibrations to other scan heads, or to itself.

Moreover, with the design of the present invention, due to the symmetry of the stage, an integrated interface of the scan head to a vacuum hose is possible. This allows a mechanism for attaching the probe head with the probe in a convenient and robust manner using an underpressure or vacuum based attachment system.

In accordance with embodiments, the support element is further shaped such as to be symmetric with respect to a notional plane perpendicular to the notional common longitudinal axis. Such additional symmetry causes the support element to be in balance in the z-direction, thereby improving the dynamic behavior thereof in use. For example during vibration in a z-direction (i.e. the longitudinal direction with respect to the support element), a counterbalanced mass resulting from such symmetry reduces the non-ideal conveying of such vibrations to the scan head. Coupling of vibrational energy to the surrounding is reduced, and the design of the scan head to prevent conveying of such vibrations is thereby improved and less complex.

In some embodiments, Z-position motion stage further comprises a balance actuator mounted on the support element at an opposite side of the notional plane with respect to the at least one first actuator. This balance actuator may be provided for the same reason as the abovementioned symmetric design in the z-direction, namely to improve the dynamic behavior of the stage in use. A balance actuator that balances the action of the first actuator efficiently reduces the conveying of vibration back to the scan head (instead of to the probe).

In some of the abovementioned symmetric or balanced embodiments, that further include earlier mentioned projecting portions, the support element comprises at least a first and a second projecting portion, wherein both the first and the second projecting portion are circumferentially arranged around the notional common longitudinal axis and rotation symmetric therewith, the first and the second projecting portions projecting in opposite directions, and wherein the first projecting portion comprises a first apex portion forming a first stationary ring for supporting the z-position motion stage on a first side thereof, and the second projecting portion comprises a second apex portion forming a second stationary ring for supporting the z-position motion stage on a second side thereof. These embodiments provide a stationary ring as earlier described and at both sides of the support element, to further reduce the dynamic coupling of vibrations to the scan head and system.

In accordance with some embodiments, the Z-position motion stage further comprises an attachment adaptor for enabling the attaching of a probe, or a probe head comprising a probe, to the z-position motion stage. The attachment adapter may be of any type, enabling easy placement, detachment, or replacement of a probe or probe head. For example, the attachment adapter may enable the earlier mentioned attachment by low pressure using a vacuum or underpressure. Alternatively, electrostatic attachment, magnetic attachment, or mechanic attachment (e.g. adhering, clamping, a suitably shaped recess cooperating with a further part) may be provided by the attachment adapter.

In some of these embodiment, which embodiments are also symmetrically shaped as described herein above, the Z-position motion stage further comprises a further element which is similar in shape and weight to the attachment adapter, the further element being mounted at an opposite side of the notional plane with respect to the attachment adapter, such as to provide a counter balance. This again causes the complete design to be symmetric with respect to the notional plane perpendicular to the longitudinal axis.

In some of these embodiments, the Z-position motion actuator further comprises a low pressure channel for enabling a low pressure to be provided to the attachment adapter, the attachment adapter comprising an opening to the low pressure channel for enabling clamping of the probe or probe head, wherein the low pressure channel is rotation symmetric around the notional common longitudinal axis. The low pressure channel may then be formed along the longitudinal axis of the support element.

In accordance with a second aspect of the invention, there is provided a scan head for use in a scanning probe microscopy system, the scan head comprising a z-position motion stage in accordance with the first aspect as described above, or any embodiment thereof.

Yet in accordance with a third aspect, there is provided a method of manufacturing a z-position motion stage for use in a scanning probe microscopy system, wherein the z-position motion stage comprises a probe or wherein the z-position motion stage is arranged for having attached thereto the probe, the method comprising the steps of: producing a support element, the support element being arranged for mounting the z-position motion stage on a scan head of the scanning probe microscopy system; and mounting of at least one first actuator on the support element for enabling motion of the probe of the scanning probe microscopy system; wherein the at least one first actuator is rotation symmetric around a notional common longitudinal axis, and wherein the step of producing the support element is performed by a machining process, the machining process including turning, such as to provide the support element having a rotation symmetric shape around a notional common longitudinal axis. The support element being shaped to be rotation symmetric around the common longitudinal axis of the Z-position stage enables to apply a turning step such as to produce the support element. Turing is a well controllable machining process that may be performed efficiently in a very accurate and predictable manner, providing a high level of precision suitable for low tolerance applications such as the z-position motion stage of the present invention.

According to a fourth aspect, the invention relates to a product of the inventive method of the third aspect, i.e. a z-position motion stage obtained using a manufacturing method according to the third aspect.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
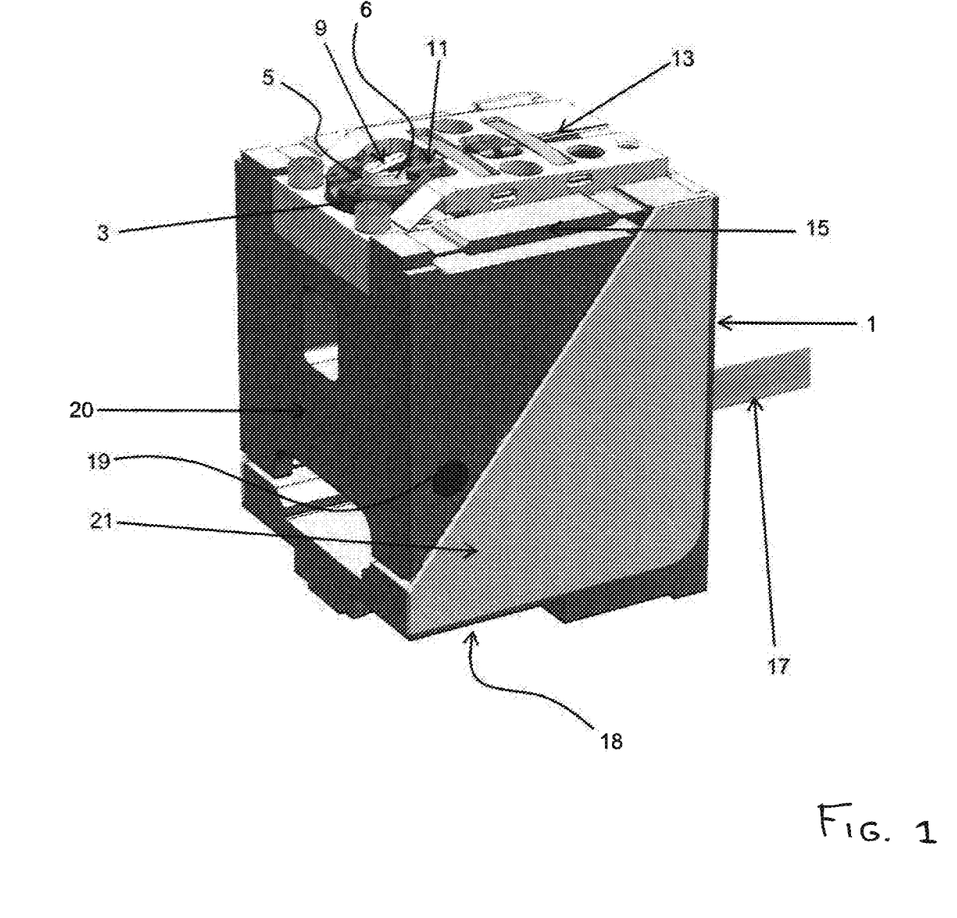
FIG. 1 illustrates a scan head comprising a Z-position motion stage in accordance with an embodiment of the invention.
Figure 2:
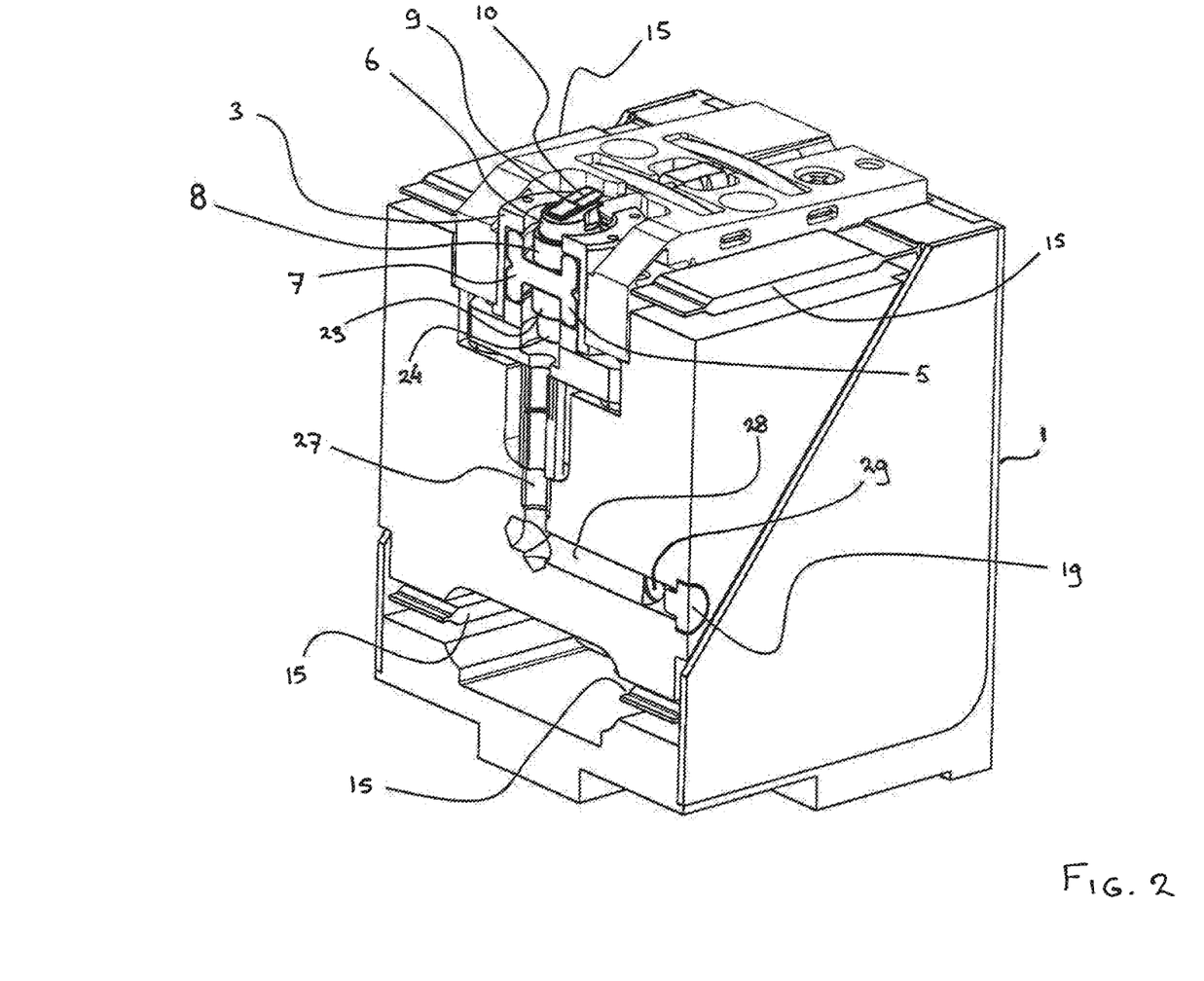
FIG. 2 illustrates a cross-section of the scan head of FIG. 1.

In FIG. 1, a scan head 1 comprises for use in a microscopy system comprises a mounting adapter 3 for mounting a Z-position motion stage 5. The Z-motion stage 5 is adapted to receive a probe head 9 on which a probe 10 for scanning a surface of a substrate to be imaged may be mounted. Reference is also made to FIG. 2, providing a cross section of the scan head 1 illustrated in FIG. 1, and revealing a number of details and parts that are internal to the scan head 1 in FIG. 1. By scanning the surface of the substrate, small structures and details on the surface that result in height variations cause the probe tip of probe 10 to deflect accordingly. The surface of the substrate can be scanned in continuous contact mode, wherein the probe is scanned across the surface while being in contact therewith. Alternatively, another frequently used mode of operation in atomic force microscopy (AFM), is the use of tapping mode, wherein the probe is vibrated in the Z-direction such that the probe tip of the probe 10 periodically touches the surface of the substrate. During scanning of the substrate with the probe 10, the probe tip will encounter surface structures that are sensed as height differences of the surface. These height differences are sensed as variations in the deflection of the probe tip. Typically, such deflections are corrected in feedback mode by moving the probe 10 in the Z-direction using a sensitive actuator, e.g. a piezo-type actuator. This motion in the Z-direction, is applied to the probe 10 via a motion actuator 8 (hereinafter sometimes referred to as first actuator 8). The deflection of the probe tip of probe 10 can be monitored using an interferometer 11.

The scan head 1 of the present invention uses a common path fiber interferometer 11 to sense the deflection signal of the probe tip to the probe 10. As may be appreciated, the invention is not limited to the use of common path type interferometer or a fiber interferometer. Other types of interferometers may be applied and are available to the skilled person. The advantage of using the common path type fiber interferometer 11 as illustrated in FIG. 1, is that it allows the design of the scan head 1 to be compact. As a result, a number of different scan heads may be applied simultaneously in a scanning probe microscopy system wherein the invention is applied. The common path type fiber interferometer 11 uses a graded index fiber at the input side near the probe 10. This graded index fiber is optically coupled to a detection interferometer at the Rx/Ry fiber alignment provision 13.

The scan head 1 allows to move the probe and probe tip towards the surface of a substrate using an approach actuator (not visible) located in the frame 20 of the scan head. Motion of the probe 10 towards the surface of the substrate, is guided via approach guidance springs 15. The scan head 1 of FIGS. 1 and 2 comprises four approach guidance springs 15, which are visible in FIG. 2. The backside 18 of the scan head 1 may comprise an encoder reader or sensor or means for cooperating with an encoder surface, such as to enable accurate position detection relative to the substrate surface. This information is required to allow imaging of the substrate surface accurately. The encoder plate sensor or reader is not visible in FIGS. 1 and 2.

The scan head 1 illustrated in FIGS. 1 and 2 comprises a vacuum clamp arrangement for clamping the probe head 9 to the Z-position motion stage 5. Vacuum clamp arrangement comprises a vacuum clamp low pressure feed hose 17 which is connected to an adapter 30 internal to the frame 20. The adapter 30 connects the hose 17 to vacuum clamp channel 29. The channel 29 connects to a further vacuum clamp channel 28 and a vacuum clamp channel 27 for providing the low pressure feed to the Z-motion stage 5 for clamping of the probe head 9. The parts of scan head 1, including the vacuum clamp arrangement, approach actuator, mounting adapter 3 for the Z-stage, the Z-position motion stage 5, and the interferometer 11 including the detection sensor 13, are housed inside frame 20. The frame 20 is closed using a cover plate 21.

In accordance with the present invention, the Z-position motion stage 5 comprises a support element 7. The support element 7 is designed and shaped to be rotation symmetric around a longitudinal axis L. The Z-position motion stage 5 further comprises a motion actuator or first actuator 8 which induces the required motion in the Z-direction of the probe 10 of the probe head 9, that allows following a height profile on the surface to be measured. Also the first actuator 8 is a rotation symmetric element, which is rotation symmetric around the longitudinal axis of Z-position motion stage 5. Moreover, also the probe or probe head attachment adapter 6 of the Z-stage 5 is a rotation symmetric element which is rotation symmetric around said longitudinal axis.

Figure 3A:
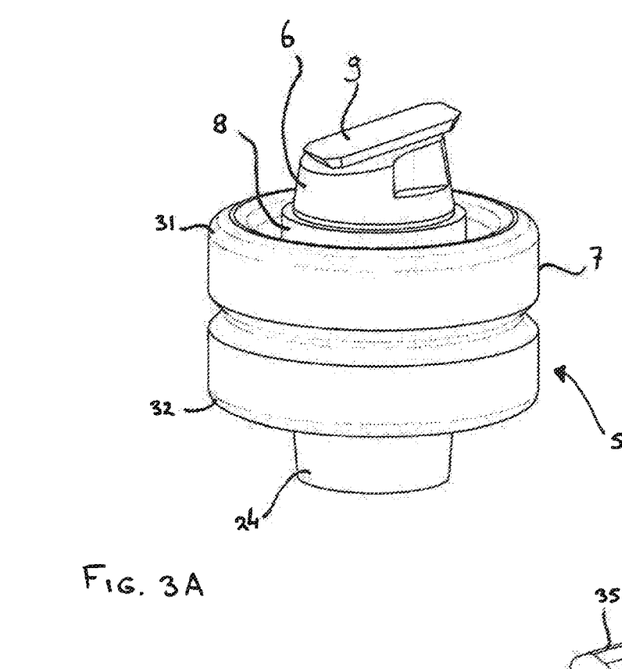
FIGS. 3A to 3B illustrate a Z-position motion stage in accordance with an embodiment of the invention.
Figure 3B:
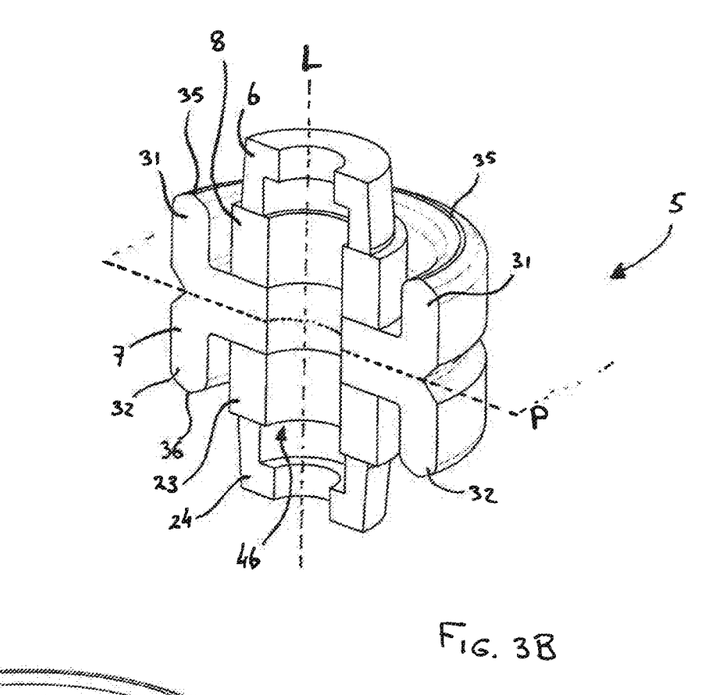

In the preferred embodiment illustrated in FIG. 2, the support element 7 is not only rotation symmetric around the longitudinal axis L, but the support element 7 is also symmetric with respect to a plane P perpendicular to the longitudinal axis. This is illustrated in the close-up illustrations of FIGS. 3A and 3B. FIG. 3A illustrates the Z-position motion stage 5, and FIG. 3B illustrates the same Z-position motion stage 5 in cross section, revealing both the longitudinal axis L and the perpendicular base plane P. As can be seen in FIG. 3B, the support element 7 is symmetric with respect to the plane P perpendicular to the longitudinal axis L. This results in the bottom section of support element 7 to be identical and mirrored to the top section of support element 7. Similarly, also the motion actuator 8 is balanced by an identical motion actuator 23 in the bottom section of the Z-position motion stage 5. Likewise, the attachment adapter 6 for the probe head 9 is mirrored using a similar adapter 24 in the bottom section of the Z-position motion stage 5. The advantage of the symmetric design, both the rotation symmetric design around the longitudinal axis L as well as the symmetric design with respect to the plane P, is obtained in the dynamic behavior of the Z-position motion stage 5. By balancing the element 5, dissipation of energy in terms of vibrational energy being conveyed from the Z-position motion stage 5 to the scan head 1 is effectively reduced.

A further advantage is obtained by the shaping of the support element 7. Considering the upper section of the support element 7 above the plane P, the support element 7 comprises a ring shaped projecting portion 31. The projecting portion 31 has a rounded upper shape resulting in a apex 35. The apex 35 forms a stationary ring 35 in the symmetric embodiment of FIG. 3B, a similar projection portion 32 is present on the bottom section, extending in the opposite direction. A further stationary ring 36 is formed on the apex of the rounded shape of projecting portion 32. As may be seen in FIG. 2, the stationary ring 35 and the stationary ring 32 provide the contact surfaces with the structures of the scan head 1. As will be explained further below, this mounting of the Z-position motion stage 5 in the scan head 1 results in an effective decoupling of the elements, effectively preventing vibrations to be conveyed to the scan head 1.

Figure 4:
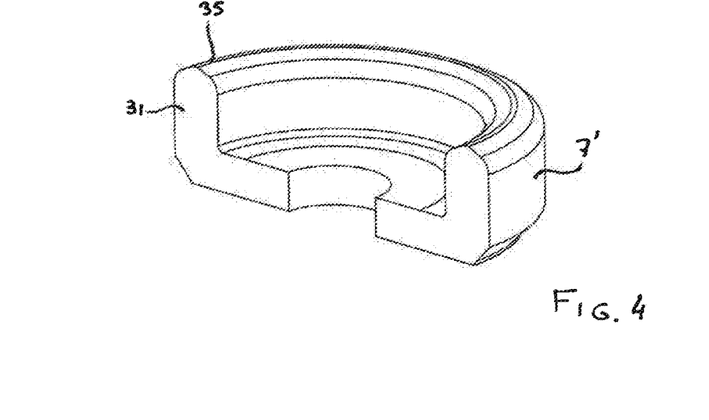
FIG. 4 illustrates an alternative support element for use in a Z-position motion stage in accordance with an embodiment of the invention.

An alternative design of a support element 7' is illustrated in FIG. 4. In this embodiment, the support element 7 comprises the stationary ring 35 and the projecting portion 31, and it is also rotation symmetric with respect to the longitudinal axis L. However, in contrast to the embodiment illustrated in FIGS. 3A and 3B, the support element 7' is not symmetric relative to a plane P perpendicular to the longitudinal axis L. Although not all advantages are achieved in the embodiment of FIG. 4, the rotation symmetric design of the support element 7' as well as the projection portion 31 forming the stationary ring 35 provide an improved dynamic behavior with respect to conventional scan head solutions.

Figure 5A:
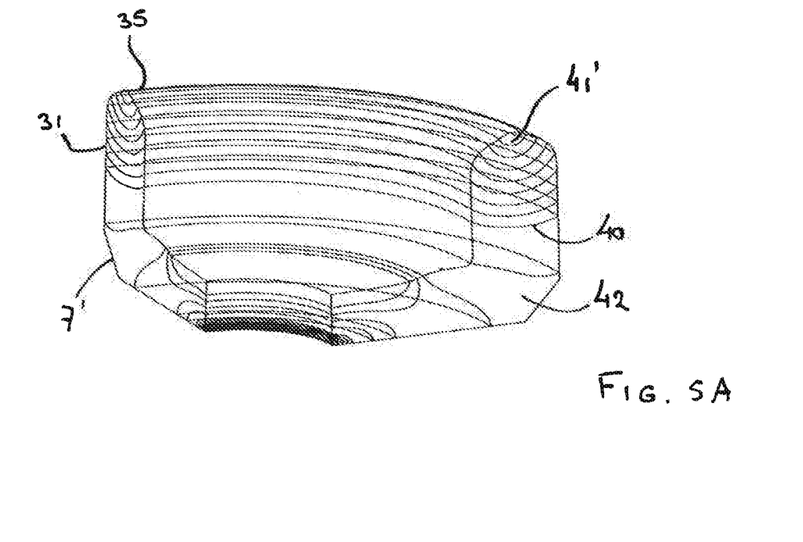
FIGS. 5A and 5B is a cross-section of the support element of FIG. 4 used in a mathematical model visualizing deformation in use.
Figure 5B:
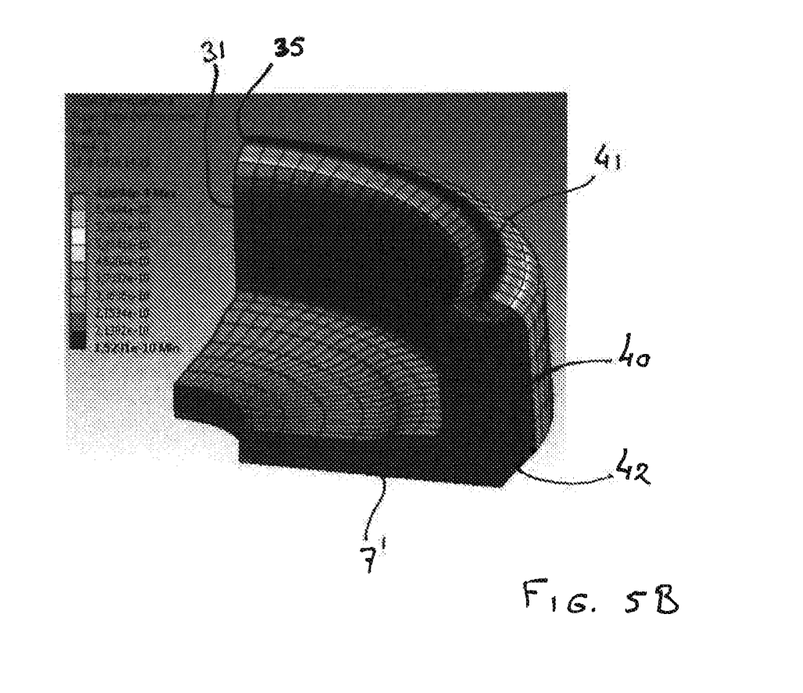

The dynamic behavior of the support element 7' has been modelled to illustrate the forming of the stationary ring 35. The results of a computational model are illustrated in FIG. 5B. FIG. 5A illustrates iso-deformation lines wherein deformations in response to vibrations induced the actuator 8 of the Z-position motion stage 5 are more or less on a same level. Similar iso-deformation lines 40 are illustrated in FIG. 5B in the computational model. Maximal deformation is experienced by the support element 7 for example in area 42 of the support element 7'. In the apex 35 of the support element 7', more or less in the area 41, the deformation induced by vibration in the actuator 8 is much less (approximately 25 times less). For this reason, the stationary ring 35 formed on the apex of the projecting portion 31 may best be used for supporting the Z-position motion stage in the scan head 1 to prevent vibrations to be conveyed to the scan head.

Figure 6A:
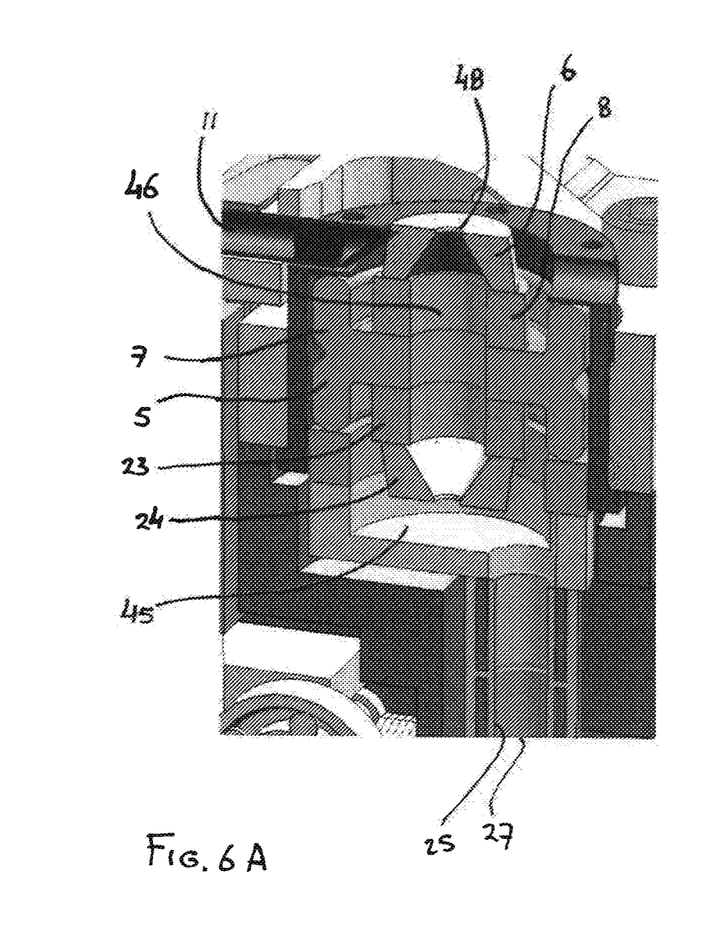
FIGS. 6A to 6C illustrate a vacuum clamping system used in a scan head including a Z-position motion stage in accordance with an embodiment of the invention.
Figure 6B:
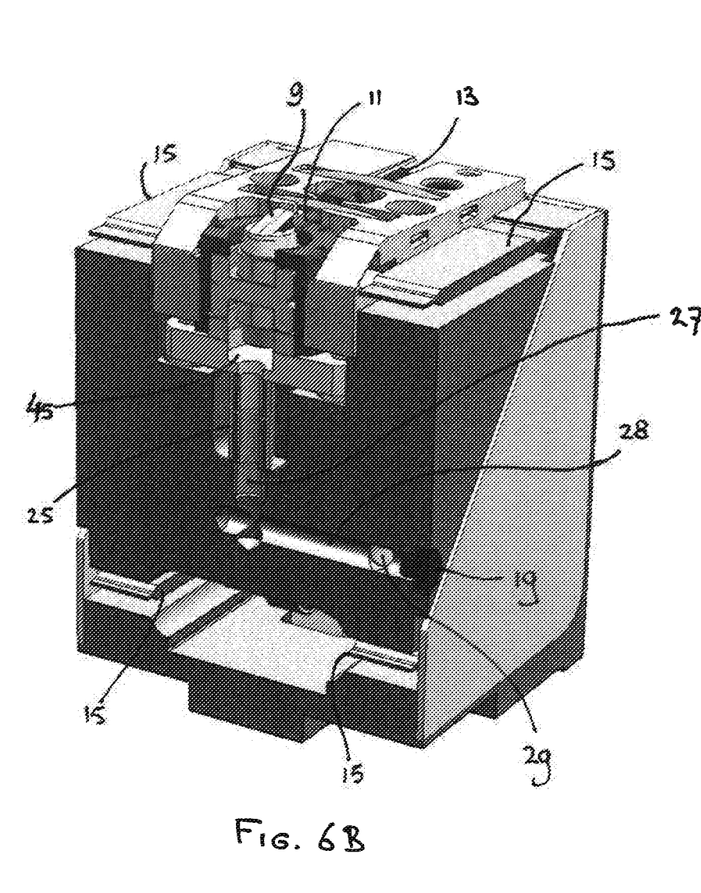
Figure 6C:
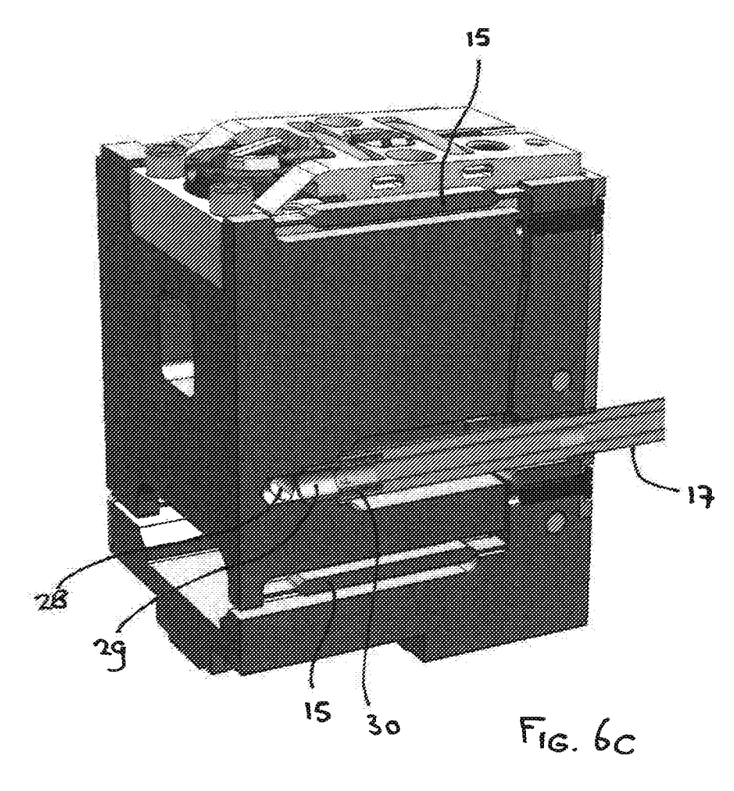

FIGS. 6A, 6B and 6C provide a more close-up illustration of the vacuum clamping arrangement of the system. In FIG. 6C, the hose 17 is connected onto vacuum clamp channel 29 via an adapter. The vacuum clamp channel 29 extends into a further vacuum clamp channel 28 which is visible in FIG. 6B. Vacuum clamp channel 28 extends into the frame 20 of the scan head towards a further channel 27. The further channel 27 extends into a further hose 25 which connects a vacuum clamp channel to a low pressure chamber 45. The counterbalance attachment element 24 of the Z-position motion stage 5 extends into the pressure motion chamber 45 formed at the end of the vacuum clamp channels. An internal cavity 46 formed between the adapters 6 and 24, the actuators 8 and 23 and the support element 7, conveys the low pressure towards the vacuum clamp 48. Probe head 9 is clamped onto the vacuum clamp 48.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

LIST OF REFERENCE SIGNS 1 scan head
3 mounting adapter Z-stage
5 Z-position motion stage
6 probe/probe head attachment adapter of Z-stage
7, 7' support element
8 motion actuator (first actuator)
9 probe head
10 probe
11 fiber interferometer
13 Rx & Ry fiber alignment provisions
15 approach guidance spring
17 vacuum clamp low pressure feed hose
18 back side of scan head
19 plug
20 frame
21 cover plate 23 balance actuator
24 counterbalance attachment element
25 internal hose connection
27 vacuum clamp channel
28 vacuum clamp channel
29 vacuum clamp channel
30 low pressure feed hose adapter
31 first projecting portion
32 second projecting portion
35 apex/first stationary ring
36 apex/second stationary ring
40 iso-deformation line
41 stationary ring area
42 base area
45 pressure chamber
46 internal cavity
48 vacuum clamp
L common longitudinal axis
P base symmetry plane

The invention claimed is:

1. A Z-position motion stage for use in a scanning probe microscopy system, the z-position motion stage configured for supporting a probe and enabling precise motion thereof in a Z-direction, and wherein the Z-position motion stage comprises:
a support element for mounting the z-position motion stage on a scan head of the scanning probe microscopy system; and
at least one first actuator mounted on the support element that enables motion of a probe of the scanning probe microscopy system,
wherein the probe is connected to or attachable to the z-position motion stage,
wherein the support element and the at least one first actuator are shaped and mounted to form a rotationally symmetric element which is rotationally symmetric around a common longitudinal axis of symmetry, wherein the common longitudinal axis of symmetry is a notional axis,
wherein the support element comprises at least one projecting portion, the at least one projecting portion being circumferentially arranged around the common longitudinal axis of symmetry and rotationally symmetric therewith, and
wherein the at least one projecting portion comprises an apex portion forming a stationary ring for supporting the z-position motion stage on the scan head.

2. The Z-position motion stage according to claim 1, wherein the support element has a circular shape in cross section transverse to the common longitudinal axis of symmetry.

3. The Z-position motion stage according to claim 1, wherein the support element is further shaped to be symmetric with respect to a plane of symmetry perpendicular to the common longitudinal axis of symmetry, the plane of symmetry being a notional plane.

4. The Z-position motion stage according to claim 3, further comprising a balance actuator mounted on the support element at an opposite side of the plane with respect to the at least one first actuator.

5. The Z-position motion stage according to claim 4, wherein the support element comprises at least a first and a second projecting portion,
wherein both the first projecting portion and the second projecting portion are circumferentially arranged around the common longitudinal axis of symmetry and rotationally symmetric therewith, the first and the second projecting portions projecting in opposite directions, and
wherein the first projecting portion comprises a first apex portion forming a first stationary ring for supporting the z-position motion stage on a first side thereof, and the second projecting portion comprises a second apex portion forming a second stationary ring for supporting the z-position motion stage on a second side thereof.

6. The Z-position motion stage according to claim 1, further comprising an attachment adaptor that enables the attaching of a probe, or a probe head comprising a probe, to the z-position motion stage.

7. The Z-position motion stage according to claim 6, wherein the support element is further shaped to be symmetric with respect to a plane of symmetry perpendicular to the common longitudinal axis of symmetry, and further comprising:
a balance actuator mounted on the support element at an opposite side of the plane of symmetry with respect to the at least one first actuator; and
a further element which is similar in shape and weight to the attachment adapter, the further element being mounted at an opposite side of the plane of symmetry with respect to the attachment adapter, to provide a counter balance.

8. The Z-position motion stage according to claim 6, further comprising a low pressure channel for enabling a low pressure to be provided to the attachment adapter,
wherein the attachment adapter comprises an opening to the low pressure channel that enables clamping of the probe or probe head, and
wherein the low pressure channel is rotationally symmetric around the common longitudinal axis of symmetry.

9. A scan head for use in a scanning probe microscopy system, the scan head comprising a z-position motion stage comprising:
a support element for mounting the z-position motion stage on a scan head of the scanning probe microscopy system; and
at least one first actuator mounted on the support element that enables motion of a probe of the scanning probe microscopy system,
wherein the probe is connected to or attachable to the z-position motion stage,
wherein the support element and the at least one first actuator are shaped and mounted to form a rotationally symmetric element which is rotationally symmetric around a common longitudinal axis of symmetry,
wherein the support element comprises at least one projecting portion, the at least one projecting portion being circumferentially arranged around the common longitudinal axis of symmetry and rotationally symmetric therewith, and
wherein the at least one projecting portion comprises an apex portion forming a stationary ring for supporting the z-position motion stage on the scan head.

10. A method of manufacturing a z-position motion stage for use in a scanning probe microscopy system, wherein the z-position motion stage comprises a probe or wherein the z-position motion stage is arranged for having attached thereto the probe, the method comprising:
producing a support element, the support element being arranged for mounting the z-position motion stage on a scan head of the scanning probe microscopy system; and mounting of at least one first actuator on the support element that enables motion of the probe of the scanning probe microscopy system;

wherein the at least one first actuator is rotationally symmetric around a common longitudinal axis of symmetry, the common longitudinal axis of symmetry being a notional axis, and wherein the step of producing the support element is performed by a machining process, the machining process including turning, to provide the support element having a rotationally symmetric shape around a common longitudinal axis of symmetry, wherein the support element is manufactured comprising at least one projecting portion, the at least one projecting portion being circumferentially arranged around the common longitudinal axis of symmetry and rotationally symmetric therewith, wherein the at least one projecting portion is manufactured comprising an apex portion forming a stationary ring for supporting the z-position motion stage on the scan head.

11. A Z-position motion stage obtained using a manufacturing method according to claim 10.

12. The Z-position motion stage according to claim 3, wherein the support element comprises at least a first and a second projecting portion, wherein both the first projecting portion and the second projecting portion are circumferentially arranged around the common longitudinal axis of symmetry and rotationally symmetric therewith, the first and the second projecting portions projecting in opposite directions, and wherein the first projecting portion comprises a first apex portion forming a first stationary ring for supporting the z-position motion stage on a first side thereof, and the second projecting portion comprises a second apex portion forming a second stationary ring for supporting the z-position motion stage on a second side thereof.

13. The Z-position motion stage according to claim 7, further comprising a low pressure channel for enabling a low pressure to be provided to the attachment adapter, wherein the attachment adapter comprises an opening to the low pressure channel that enables clamping of the probe or probe head, and wherein the low pressure channel is rotationally symmetric around the common longitudinal axis of symmetry.

* * * * *